No. 679,020. Patented July 23, 1901.
H. GARRETT.
LAWN MOWER.
(Application filed Feb. 11, 1901.)
(No Model.)
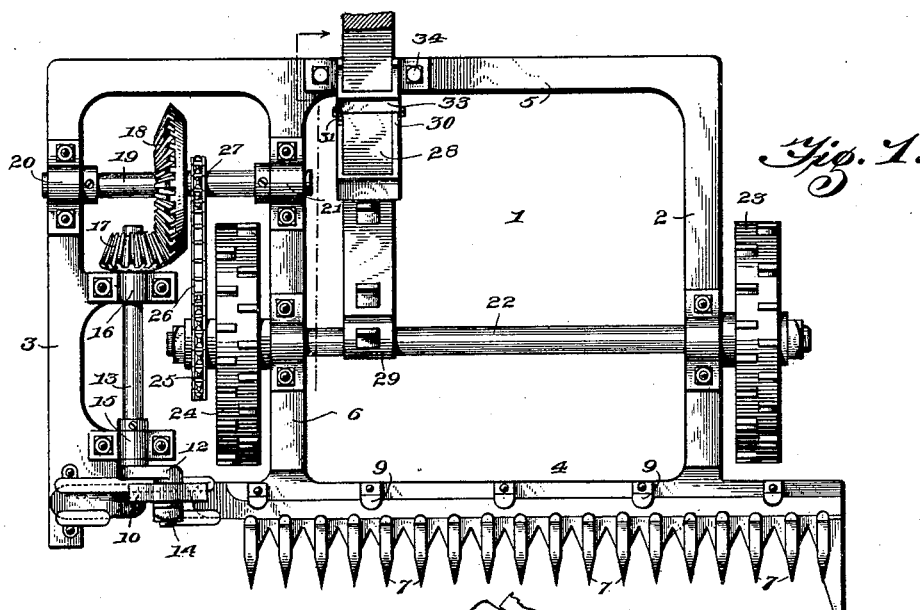
Fig. 1.
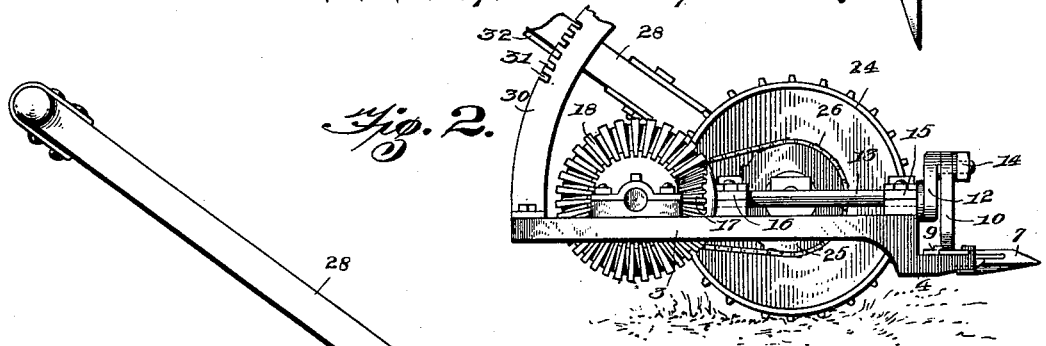
Fig. 2.
Fig. 4.
Fig. 3.
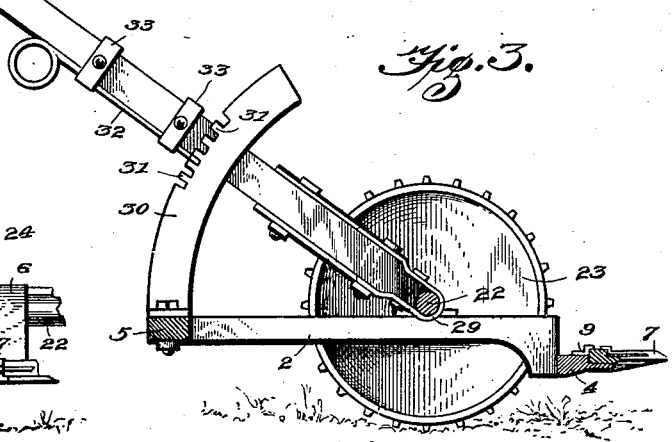
Witnesses
Henry Garrett Inventor
by C. A. Snow & Co.
Attorneys

UNITED STATES PATENT OFFICE.

HENRY GARRETT, OF PENDLETON, OREGON.

LAWN-MOWER.

SPECIFICATION forming part of Letters Patent No. 679,020, dated July 23, 1901.

Application filed February 11, 1901. Serial No. 46,913. (No model.)

*To all whom it may concern:*

Be it known that I, HENRY GARRETT, a citizen of the United States, residing at Pendleton, in the county of Umatilla and State of Oregon, have invented a new and useful Lawn-Mower, of which the following is a specification.

The invention relates to improvements in lawn-mowers.

One object of the present invention is to improve the construction of lawn-mowers and to provide a simple and comparatively inexpensive one in which the mechanism for actuating the cutter or sickle bar will be located at the back of the frame and out of the way of the grass or other substance cut, to prevent the said mechanism or gearing from becoming clogged by the severed grass, and also to enable a receptacle for such grass to be conveniently applied to the lawn-mower, if desired.

Another object of the invention is to increase the efficiency of lawn-mowers and to provide one adapted to operate on long or short grass and capable of cutting close to a tree or other obstruction.

The invention consists in the construction and novel combination and arrangement of parts hereinafter fully described, illustrated in the accompanying drawings, and pointed out in the claim hereto appended.

In the drawings, Figure 1 is a plan view of a lawn-mower constructed in accordance with this invention. Fig. 2 is a side elevation of the same. Fig. 3 is a longitudinal sectional view illustrating the manner of mounting the handle. Fig. 4 is a front elevation of a portion of the lawn-mower.

Like numerals of reference designate corresponding parts in all the figures of the drawings.

1 designates an approximately rectangular frame composed of sides 2 and 3, a depressed or downwardly-offset front 4, a back 5, and a longitudinal connecting-bar 6, located at a point between the center of the frame and the side 3 and arranged parallel with the latter. The front of the frame constitutes the finger-bar of the cutting apparatus and is provided with guard-fingers 7, constructed in the usual manner and receiving a reciprocating cutter or sickle bar, which is detachably secured in a suitable recess of the finger-bar by clips or plates 9 of the ordinary construction. The plates 9, which are bolted or otherwise secured to the finger-bar of the frame, are arranged at intervals, as clearly shown in Fig. 1. The front or finger bar of the frame is extended laterally at the left-hand side of the lawn-mower, and in practice it is designed to be provided with a suitable adjustable shoe for regulating the length of the stubble.

The reciprocating cutter-bar is provided at its inner end with an upwardly-extending arm 10, having a vertical opening 11, receiving a crank 12 of a longitudinal shaft 13, and the crank is designed to be of sufficient length to drive the knives or cutters of the cutter-bar the distance of two of the guard-fingers, whereby the cutter-bar will be reciprocated with great rapidity and will be capable of effectively cutting grass or other substance. The outer end of the crank 12 is preferably reduced and threaded to receive a nut 14, and it may be provided with a suitable antifriction device, such as a sleeve or the like. The longitudinal shaft 13, which is located parallel with and adjacent to the side bar 3 of the frame, is journaled in suitable bearings 15 and 16 and carries at its rear end a bevel-pinion 17, and the latter, which is keyed or otherwise secured to the shaft 13, meshes with a bevel gear-wheel 18, mounted on a short transverse shaft 19. The short transverse shaft 19 is journaled in suitable bearings 20 and 21 of the side bar 3 and the connecting bar or brace 6, and it is connected by sprocket-gearing with an axle 22. The axle 22, which is provided with drive or ground wheels 23 and 24, is journaled in suitable bearings of the side 2 and the brace or bar 6, and its inner end is extended beyond the wheel 24 and has a sprocket-wheel 25 keyed or otherwise secured to it. The sprocket-wheel 25 is connected by a sprocket-chain 26 with a sprocket-pinion 27, mounted on the rear transverse shaft 19. The peripheries of the drive-wheel are provided with the usual ribs or corrugations, and when the lawn-mower is pushed forward motion will be communicated through the gearing from the axle to the longitudinal shaft, which will rapidly reciprocate the cutter-bar. The gearing is located at one side of the frame and in rear of the cutting apparatus, so that it will not becomed clogged by the severed grass or other substance operated on by the lawn-mower. The arrangement of the gearing is also especially advantageous, as it will permit a receptacle to be readily mounted on the frame at the back of the cutting apparatus to receive the severed grass.

The axle serves as a pintle for an adjustable handle 28, provided at its lower end with a strap 29 and arranged within a curved yoke 30. The strap passes around the front of the shaft and is secured to and extended longitudinally of the upper and lower faces of the inclined handle 28. The yoke, which is bolted or otherwise secured to the back of the frame, is provided at opposite sides with teeth 31, which are engaged by the lower end of a sliding bolt 32, mounted in suitable guides 33 and having its lower end enlarged and extended laterally sufficiently to engage both sides of the yoke. The upper end of the bolt is preferably provided with a ring adapted to receive the finger of the operator to enable it to be reciprocated to engage it with and disengage it from the yoke. The lower ends of the sides of the yoke are bent outward at right angles and are perforated for the reception of the fastening devices 34 for securing the yoke to the back of the frame. The handle is supported by the axle and is held against lateral movement thereon by the yoke, which performs the double function of a ratchet and a support.

It will be seen that the lawn-mower is exceeding simple and inexpensive in construction, that it possesses great strength, durability, and efficiency, and that it is capable of being operated at the expenditure of a minimum amount of labor. It will also be apparent that the gearing is adapted to rapidly reciprocate the cutter-bar and is arranged out of the way, so that it cannot become clogged with the severed grass or other substance; also that the lawn-mower is adapted for cutting both long and short grass, that it will not cut the grass in small pieces, and that it is capable of cutting close to trees and other objects.

The lawn-mower may be provided with any suitable clutch mechanism for enabling it to be thrown out of gear when it is desired to move the lawn-mower from one place to another and also to prevent the operation of the cutting mechanism when the lawn-mower is drawn backward. The ordinary clutch mechanism for connecting the carrying-wheels with the shaft or axle of an ordinary lawn-mower may be employed for this purpose; but the clutch may be arranged at any other point, if desired.

What I claim is—

In a lawn-mower, the combination of a rectangular frame provided with a longitudinal connecting-bar extending from the front of the frame to the back of the same, a cutting mechanism arranged at the front of the frame, the axle 22 extending from one side of the frame to the connecting-bar and journaled in suitable bearings thereof, wheels mounted on the axle, gearing connecting the axle with the cutting mechanism, the inclined handle 28 connected at its lower end to the axle and supported by the same, the curved yoke mounted upon and extending upward from the back of the frame and receiving the handle and holding the same against lateral movement, and a locking device mounted on the handle and engaging the yoke and securing the handle at the desired adjustment, substantially as described.

In testimony that I claim the foregoing as my own I have hereto affixed my signature in the presence of two witnesses.

HENRY GARRETT.

Witnesses:
CHAS. C. SHARP,
H. M. SLOEM.